Figure 1:
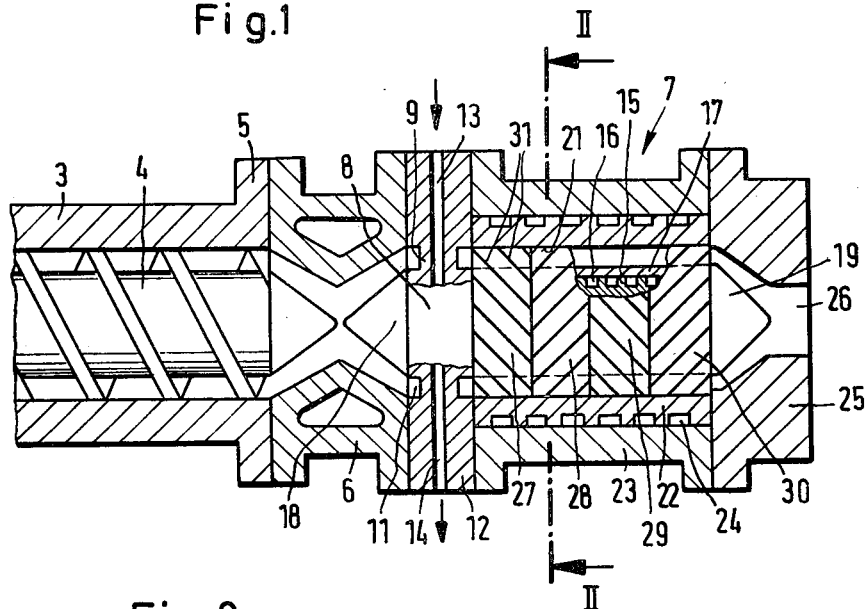

United States Patent [19]

Brand

[11] 4,201,480
[45] May 6, 1980

[54] EXTRUSION APPARATUS FOR MANUFACTURING FOAMED THERMOPLASTIC MATERIAL

[75] Inventor: Wilhelm Brand, Hannover, Fed. Rep. of Germany

[73] Assignee: Hermann Berstorff Maschinenbau GmbH, Hannover Kleefeld, Fed. Rep. of Germany

[21] Appl. No.: 937,923

[22] Filed: Aug. 30, 1978

[30] Foreign Application Priority Data

Sep. 6, 1977 [DE] Fed. Rep. of Germany ....... 2739998

[51] Int. Cl.² ............................ B01F 3/04; B01F 5/06; B01F 15/00; B01F 15/06
[52] U.S. Cl. ......................................... 366/79; 264/53; 366/144; 366/337; 425/461; 425/817 C
[58] Field of Search ................. 425/461, 4 R, 817 C; 264/53, DIG. 5, 51; 336/337, 339, 341; 366/79, 144

[56] References Cited

U.S. PATENT DOCUMENTS

| | | | |
|---|---|---|---|
| 3,358,749 | 12/1967 | Chisholm et al. | 366/337 X |
| 3,582,045 | 6/1971 | Leybourne | 366/339 |
| 3,652,061 | 3/1972 | Chisholm | 366/337 |
| 3,687,582 | 8/1972 | Hendry et al. | 264/DIG. 5 |
| 3,704,006 | 11/1972 | Grout et al. | 366/339 X |
| 3,711,067 | 1/1973 | Kovacs | 264/53 X |
| 3,751,377 | 8/1973 | Buckner | 264/53 X |
| 3,942,765 | 3/1976 | Hendrickson | 366/341 X |
| 4,040,256 | 8/1977 | Bosche et al. | 366/337 X |

FOREIGN PATENT DOCUMENTS

| | | | |
|---|---|---|---|
| 106404 | 1/1967 | Denmark | 425/461 |
| 1101504 | 1/1968 | United Kingdom . | |
| 1189484 | 4/1970 | United Kingdom | 336/339 |

*Primary Examiner*—Philip Anderson
*Attorney, Agent, or Firm*—Schwartz, Jeffery, Schwaab, Mack, Blumenthal & Koch

[57] ABSTRACT

Extrusion apparatus for manufacturing blow moulded sheets of expanded polystyrene wherein, following an extruder there is a static cooler/mixer member comprising inner and outer cooling surfaces defining between them an annular passage, the inner cooling surface having a star-shaped outline when viewed in cross-section with the points of the star extending at an oblique angle to the longitudinal axis. Preferably the star-shaped outline is provided by folded metal strips several of which are provided alternately angled and staggered with respect to one another.

7 Claims, 2 Drawing Figures

EXTRUSION APPARATUS FOR MANUFACTURING FOAMED THERMOPLASTIC MATERIAL

The invention relates to extrusion apparatus for manufacturing foamed thermoplastics material, in particular for blow moulding sheets of expanded polystyrene, comprising an extruder for melting the plastics material and mixing in the propellant additive and a static cooler/mixer member disposed downstream of the extruder, which has an outer cooling surface and an inner cooling surface defining between them an annular passage through which the expansible plastics material flows in an axial direction.

When extruding expanded polystyrene it is important that the expansible polystyrene material is cooled down to a certain temperature before leaving the die. It is also of fundamental importance during the extrusion of expanded polystyrene to produce an even distribution of temperature in the polystyrene materials since otherwise the final product will have an irregular cell structure and with it irregular surfaces.

Extrusion apparatus of the kind described above for manufacturing blow moulding sheets of expanded polystyrene is known, having a static cooler/mixer member which is disposed downstream of the extruder. The cylinder of the cooler/mixer member can be cooled and provides an outer cooling surface for the expansible polystyrene material. A mandrel, which can be cooled by cooling liquid, is disposed coaxially with the outer cooling surface and has a plurality of radially disposed cooling ribs for the repeated dividing and recombining of the polystyrene material.

It is possible with such apparatus to cool the melted expansible polystyrene sufficiently. It has however been discovered that the simultaneous mixing of the melted polystyrene with a view to obtaining a more even temperature distribution is not adequately achieved with regard to the required product quality. This observation is explained by the fact that after each respective dividing of the plastics material the flow branches are brought together again in the same vicinity. Therefore, the mixing effect in this known static cooler/mixer member is not high.

The invention has among its objects to provide extrusion apparatus of the kind described at the outset having a static cooler/mixer member, wherein the static cooler/mixer member is designed in such a way that the melted expansible plastics material has a more even temperature distribution before leaving the die.

This object is achieved in that, according to the invention the static cooler/mixer member has a star-shaped outline when viewed in cross-section with the points of the star formed by edges which extend at an oblique angle to the longitudinal axis of said cooler/mixer member.

Such a development of the inner cooling surface of the static cooler/mixer member results in a dividing of the expansible plastics material so that an enlarged cooling surface area is created. Varying speeds of flow now arise in each respective material passage formed between two adjacent points of the star, thus causing the plastics material leaving the cooler/mixer member to be better mixed together. A more homogenous mixing of the melted plastics material and thus a more even temperature distribution can be achieved.

In an advantageous embodiment of the invention the inner cooling surface has a per se known heat regulated central mandrel bearing at least one metal strip folded to form said star-shaped outline, folded edges of the strip forming the points of the star extending parallel to one another and at an oblique angle to the longitudinal axis of the cooler/mixer member.

The star-shaped folded metal strip co-operates with the cylinder to form outer material passages and co-operates with the central mandrel to form inner material passages. The good mixing effect is increased by the presence of these outer and inner passages. The intervals between the cooling surfaces are always even thus ensuring an even heat regulation of the melted material.

In another advantageous embodiment of the invention there are at least two metal strips folded in the shape of a star disposed on the central mandrel, the points of which, extending at an oblique angle to the longitudinal axis, are alternately arranged in opposing directions. The direction of obliquity of the passages formed by the points alters from one metal strip to the other. This can likewise influence the mixing action.

Advantageously, at least two metal strips folded in the shape of a star are disposed on the central mandrel, which are respectively staggered in relation to one another in such a way that each beginning of a point of the one metal strip folded in the shape of a star is respectively located between two points of the metal strip respectively adjacent. This arrangement of a plurality of metal strips folded in the shape of a star results in a repeated dividing of the flow. Material from an outer passage is thus divided during transition to the adjacent downstream metal strip so that it flows into one inner passage and two neighbouring outer passages of the adjacent metal strip. This can ensure that each melted particle is evenly cooled.

It is advantageous when arranging a plurality of metal strips folded in the shape of a star on a central mandrel to connect the metal strips firmly to one another. This occurs preferably at the frontal crossing points. Thus the metal strips folded in the shape of stars can be withdrawn from the annular passage between the cylinder and the central mandrel for cleaning.

Advantageously the flanks of the strips have perforations therein. Particles of the melted material can thus pass from one material passage to another and further increase the mixing action.

A static cooler/mixer member is preferably provided which has the particular advantage of always providing even intervals between the cooling surfaces thus ensuring an even heat regulation of the melted material.

Figure 2:
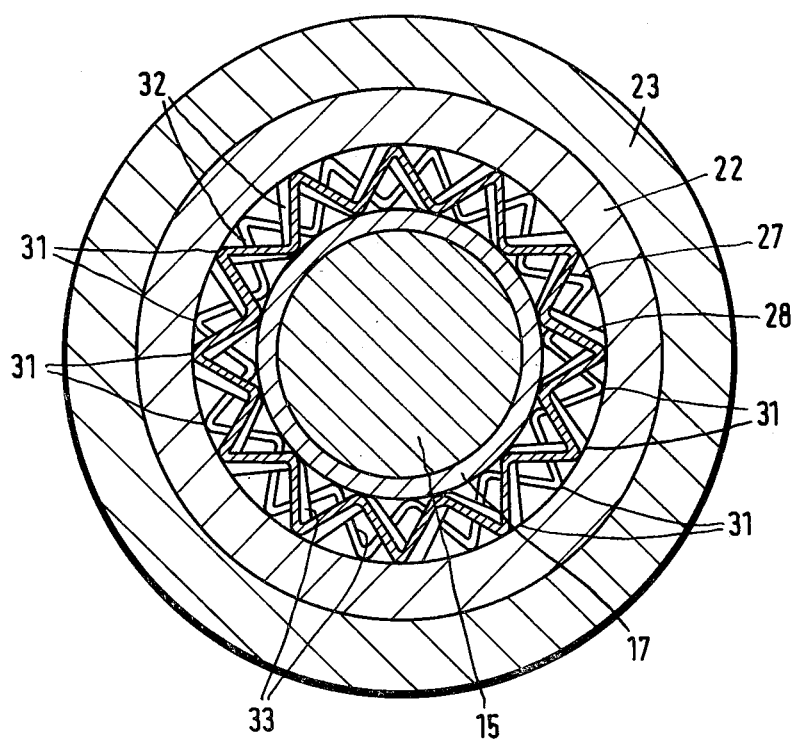

The invention is diagrammatically illustrated by way of example in the accompanying drawing, in which:

FIG. 1 shows in longitudinal section the end of a screw extruder with an attached cooler/mixer member of extrusion apparatus according to the invention; and FIG. 2 shows a cross-section through the cooler/mixer member taken on line II—II on FIG. 1 on an enlarged scale, heat regulating passages not being shown.

Referring to the drawing, extrusion apparatus comprises an only partially illustrated screw extruder having a cylinder 3, in which a screw 4 is rotatably mounted. A coolable intermediate piece 6 is flanged to the output end flange 5 of the cylinder 3 and a cooler/mixer member 7 is connected to the intermediate piece 6. The cooler/mixer member 7 has an intermediate ring 12 holding a central mandrel 8 by way of webs 9 and 11.

The intermediate ring 12 has cooling bores 13 and 14 for the supply and exhaust of a cooling medium. The central mandrel 8 comprises a cylindrical jacket 17 in which a core 15 with helical cooling passages 16 is disposed. The jacket 17 is limited at its opposite ends by terminal cones 18 and 19. The central mandrel 8 is held coaxially in a cylinder bore 21 of a coolable cylinder member 22, 23 of the cooler/mixer member 7 by way of the webs 9 and 11 connected firmly thereto. The cylinder member 22, 23 comprises an inner cylinder liner 22, which has helical cooling grooves 24 on its outer periphery and a cylinder jacket 23 drawn over the cylinder liner 22, an end member 25 with a material outlet bore 26 being flanged to the cylinder jacket 23. The cooling grooves 24 of the cylinder member 22, 23 are connected to a further cooling agent circulating system by connections (not shown). The central mandrel 8 bears four metal strips 27, 28, 29 and 30 each folded in the shape of a multi-point star with the folded edges of each strip forming the points of the star extending parallel to one another and at an oblique angle to the longitudinal axis of the cooler/mixer member 7. The folded edges forming the points 31, angled obliquely to the longitudinal axis, of the four metal strips 27 to 30 are arranged alternately in opposing directions. The metal strips 27 to 30 folded in the shape of a star are staggered respectively in relation to one another. In this way each beginning of a point 31 of a metal strip 27 to 30 folded in the shape of a star is always between two points 31 of the respective adjacent metal strip 27 to 30. The metal strips 27 to 30 are welded to one another at their crossing points. Outer material passages 32 are formed between the metal strips 27 to 30 and the wall of the cylinder bore 21 of the cylinder member and inner material passages 33 are formed between the metal strips 27 to 30 and the outer surface of the jacket 17 of the central mandrel 8.

The method of operation of the described arrangement is as follows:

Molten plastics material mixed with a propellant is pressed from the screw extruder 3, 4 into the annular passage of the cooler/mixer member 7. The molten expansible plastics material is divided up by the metal strips 27 to 30 folded in the shape of a star and flows through the inner 33 and outer 32 material passages of the first metal strip 27. In each material passage 32 or 33 differing speeds of flow occur so that mixing has already taken place when the material leaves the zone of the first strip 27. On entering the zone of the second metal strip 28 the flow is again divided up. Molten plastics material flows from an outer material passage 33 into two neighbouring outer material passages 32 of the adjacent second metal strip 28. The same dividing process occurs in the transition to the zones of the third metal strip 29 and the fourth metal strip 30.

What is claimed is:

1. Extrusion apparatus for manufacturing foamed thermoplastics material, in particular for blow moulding sheets of expanded polystyrene, comprising an extruder for melting the plastics material and a static cooling and mixing member disposed downstream of the extruder, said static cooling and mixing member including means defining an outer cooling surface and means defining an inner cooling surface, said means defining said inner and outer cooling surfaces defining between them an annular passage through which the expansible plastics material flows in an axial direction, and at least one metal strip member positioned in said annular passage, said metal strip member being star-shaped in cross section having outer points which engage said means defining said outer cooling surface and inner points which engage said means defining said inner cooling surface, thereby defining inner and outer material passages, the edges of said metal strip member extending at an oblique angle relative to the longitudinal axis of said static cooling and mixing member, whereby said material is divided and evenly cooled.

2. Extrusion apparatus as claimed in claim 1, wherein said folded edges of said strip member extend parallel to one another.

3. Extrusion apparatus as claimed in claim 2, wherein at least two metal strip members folded in the shape of a star are provided in succession one to the other in an axial direction, the points of both of which extend at an oblique angle to said longitudinal axis and are arranged alternately in opposing directions.

4. Extrusion apparatus as claimed in claim 3, wherein said two metal strip members are staggered in relation to one another in such a way that the edges of one of said metal strip members are located in a peripherally staggered position relative to the edges of the other strip member whereby said material is divided as it flows from one member to the other, at least certain of the material flowing from the inner material passages of the upstream member to the outer material passages of the downstream member thereby to thoroughly mix and cool the material.

5. Extrusion apparatus as claimed in claim 3, wherein said two metal strips are firmly connected to one another.

6. Extrusion apparatus as claimed in claim 1, wherein flanks of said metal strip have perforations therein to permit the flow of material between said inner and outer material passages, thereby further increasing the mixing action.

7. Extrusion apparatus as claimed in claim 1, wherein four metal strip members are provided in succession in an axial direction, the edges and points of adjacent strip members being peripherally staggered whereby said material is divided as it flows from one strip member to the next, at least certain of the material flowing from the inner or outer material passages of an upstream member to the outer or inner material passages, respectively, of the adjacent downstream member thereby to thoroughly mix and cool the material.

* * * * *